United States Patent
Morita (10) Patent No.: US 11,162,375 B2
(45) Date of Patent: Nov. 2, 2021

(54) TURBOCHARGER

(71) Applicant: IHI Corporation, Koto-ku (JP)

(72) Inventor: Isao Morita, Koto-ku (JP)

(73) Assignee: IHI Corporation, Koto-ku (JP)

( * ) Notice: Subject to any disclaimer, the term of this patent is extended or adjusted under 35 U.S.C. 154(b) by 121 days.

(21) Appl. No.: 16/487,758

(22) PCT Filed: Feb. 22, 2018

(86) PCT No.: PCT/JP2018/006374
§ 371 (c)(1),
(2) Date: Aug. 21, 2019

(87) PCT Pub. No.: WO2018/155532
PCT Pub. Date: Aug. 30, 2018

(65) Prior Publication Data
US 2019/0383152 A1 Dec. 19, 2019

(30) Foreign Application Priority Data
Feb. 22, 2017 (JP) .............................. JP2017-031247

(51) Int. Cl.
*F01D 9/02* (2006.01)
*F02B 37/02* (2006.01)

(52) U.S. Cl.
CPC ............ *F01D 9/026* (2013.01); *F02B 37/025* (2013.01); *F05D 2220/40* (2013.01); *F05D 2240/12* (2013.01)

(58) Field of Classification Search
CPC .... F01D 9/026; F02B 37/025; F05D 2220/40; F05D 2240/12
(Continued)

(56) References Cited

U.S. PATENT DOCUMENTS 4,111,598 A    9/1978 Kasuya
2009/0290980 A1  11/2009 Higashimori
(Continued)

FOREIGN PATENT DOCUMENTS

CN    102203396 A    9/2011
CN    102733931 A    10/2012
(Continued)

OTHER PUBLICATIONS

International Search Report dated May 15, 2018 in PCT/JP2018/006374 filed Feb. 22, 2018.

*Primary Examiner* — Mahmoud Gimie
(74) *Attorney, Agent, or Firm* — Oblon, McClelland, Maier & Neustadt, L.L.P.

(57) ABSTRACT

A turbocharger includes a turbine housing having a hub-side scroll flow path and a shroud-side scroll flow path, and a turbine wheel having front edges for receiving a working fluid from the hub-side scroll flow path and the shroud-side scroll flow path. Each front edge of the turbine wheel includes a first portion for receiving the working fluid flowing out from the hub-side scroll flow path, and a second portion for receiving the working fluid flowing out from the shroud-side scroll flow path. The first portion is inclined with respect to a virtual plane including a rotational axis in a direction opposite a rotational direction of the turbine wheel. The second portion is inclined with respect to the virtual plane in the rotational direction.

14 Claims, 5 Drawing Sheets

(58) Field of Classification Search
USPC .......................................................... 415/184
See application file for complete search history.

(56) References Cited

U.S. PATENT DOCUMENTS

| | | | |
|---|---|---|---|
| 2010/0098548 A1 | 4/2010 | Yokoyama et al. | |
| 2011/0206500 A1 | 8/2011 | Nagao et al. | |
| 2013/0121820 A1 | 5/2013 | Yoshida et al. | |
| 2014/0294577 A1* | 10/2014 | Yoshida | F04D 29/403 |
| | | | 415/204 |
| 2014/0356153 A1* | 12/2014 | Hoshi | F02B 37/025 |
| | | | 415/205 |
| 2015/0086396 A1 | 3/2015 | Nasir | |
| 2015/0330226 A1 | 11/2015 | Yokoyama et al. | |
| 2015/0345316 A1* | 12/2015 | Henderson | F01D 9/026 |
| | | | 415/204 |
| 2016/0290219 A1* | 10/2016 | Smiljanovski | F01D 9/026 |
| 2017/0022830 A1 | 1/2017 | Hughes | |
| 2017/0292381 A1* | 10/2017 | Ishii | F01D 17/14 |

FOREIGN PATENT DOCUMENTS

| | | |
|---|---|---|
| CN | 103038479 A | 4/2013 |
| CN | 103874835 A | 6/2014 |
| CN | 104024600 A | 9/2014 |
| DE | 102013223873 A1 | 5/2015 |
| JP | 50-140722 | 11/1975 |
| JP | 03-123906 U | 12/1991 |
| JP | 2008-128064 A | 6/2008 |
| JP | 2009-281197 A | 12/2009 |
| JP | 2011-132810 | 7/2011 |
| JP | 2012-97699 A | 5/2012 |
| JP | 2012-177355 A | 9/2012 |
| JP | 2013-113149 A | 6/2013 |
| JP | 2013-142324 A | 7/2013 |
| JP | 2016-56804 A | 4/2016 |
| JP | 2017-032067 A | 2/2017 |
| JP | 2017-072094 A | 4/2017 |
| WO | WO 2014/102981 A1 | 7/2014 |

* cited by examiner

TURBOCHARGER

TECHNICAL FIELD

The present disclosure relates to a turbocharger.

BACKGROUND ART

Turbines used for vehicle turbochargers (Patent Documents 1 and 2) are known in this technical field. A diagonal flow turbine disclosed in Patent Document 1 is devised such that the shape of an inlet side edge of a vane functions effectively in supplying a working fluid from a hub side and a shroud side. In other words, incidence loss is reduced in the diagonal flow turbine. A diagonal flow turbine disclosed in Patent Document 2 reduces incidence loss. Incidence in Patent Document 2 refers to the difference between the flow angle of exhaust gas and the inlet metal angle of a blade.

CITATION LIST

Patent Literature

Patent Document 1: Japanese Unexamined Patent Publication No. 2009-281197
Patent Document 2: Japanese Unexamined Patent Publication No. 2012-177355

SUMMARY OF INVENTION

Technical Problem

Some turbochargers include what is called a twin scroll flow path which is composed of two flow paths. A turbocharger with a twin scroll flow path provides a working fluid from each scroll flow path to front edges of rotor blades of the turbocharger. The relative state between the flow of the working fluid provided from the scroll flow paths and the blades affects efficiency of the turbocharger. Thus, the present disclosure describes a turbocharger that is capable of improving efficiency by focusing on the relative state between the flow of the working fluid provided from the scroll flow paths and the blades.

Solution to Problem

A turbocharger according to one embodiment of the present disclosure includes a housing having a first scroll flow path and a second scroll flow path formed so as to surround a predetermined axis, and a turbine wheel which has front edges for receiving a working fluid from the first scroll flow path and the second scroll flow path and which is disposed in the housing so as to be surrounded by the first scroll flow path and the second scroll flow path with the axis as a rotational axis. The turbine wheel has blades having the front edges and a hub including base ends of the blades. The housing includes a shroud covering the blades. Each front edge includes a first portion for receiving the working fluid flowing out from the first scroll flow path, and a second portion disposed more toward the shroud than the first portion for receiving the working fluid flowing out from the second scroll flow path. The first portion is inclined with respect to a virtual plane including the axis in a direction opposite a rotational direction of the turbine wheel. The second portion is inclined with respect to the virtual plane in the rotational direction.

Effects of Invention

According to the turbocharger of the present disclosure, efficiency is improved.

DESCRIPTION OF EMBODIMENTS

A turbocharger according to one embodiment of the present disclosure includes a housing having a first scroll flow path and a second scroll flow path formed so as to surround a predetermined axis, and a turbine wheel which has front edges for receiving a working fluid from the first scroll flow path and the second scroll flow path and which is disposed in the housing so as to be surrounded by the first scroll flow path and the second scroll flow path with the axis as a rotational axis. The turbine wheel has blades having the front edges and a hub including base ends of the blades. The housing includes a shroud covering the blades. Each front edge includes a first portion for receiving the working fluid flowing out from the first scroll flow path, and a second portion disposed more toward the shroud than the first portion for receiving the working fluid flowing out from the second scroll flow path. The first portion is inclined with respect to a virtual plane including the axis in a direction opposite a rotational direction of the turbine wheel. The second portion is inclined with respect to the virtual plane in the rotational direction.

In this turbocharger, each front edge, which receives the working fluid from the scroll flow paths, is partially inclined with respect to the virtual plane including the axis. Specifically, the first portion of the front edge that receives the working fluid from the first scroll flow path is inclined with respect to the virtual plane in the direction opposite the rotational direction of the turbine wheel. Such first portion enables the working fluid from the first scroll flow path to be received by the blade while suppressing separation of the flow of the working fluid. Additionally, the second portion of the front edge that receives the working fluid from the second scroll flow path is inclined with respect to the virtual plane in the rotational direction of the turbine wheel. Such second portion enables the working fluid from the second scroll flow path to be received by the blade while suppressing separation of the flow of the working fluid. As a result, efficiency of the turbocharger is improved.

In some embodiments, each front edge may include a third portion which is formed between the first portion and the second portion and which has a region parallel to the virtual plane. This configuration enables the working fluid to be received by the blade while advantageously suppressing separation of the working fluid. Thus, the efficiency of the turbocharger is improved.

In some embodiments, where a length of each front edge from the hub to the shroud is 1, the first portion may include a first reference point set to a position on the front edge at a length ¼ from the hub. The second portion may include a second reference point set to a position on the front edge at a length ¾ from the hub. This configuration enables the working fluid to be received by the blade while further suppressing separation of the working fluid. Thus, the efficiency of the turbocharger is further improved.

In some embodiments, the difference between a first blade angle of the front edge at the first reference point and a second blade angle of the front edge at the second reference point may be 1 to 10 degrees. This configuration enables the working fluid to be received by the blade while even further suppressing separation of the working fluid. Thus, the efficiency of the turbocharger is even further improved.

In some embodiments, at each front edge, a length from the axis to the front edge may be constant along the axis. This configuration also enables the separation of the working fluid to be suppressed. Thus, the efficiency of the turbocharger is improved.

In some embodiments, the housing may have a partition wall separating the first scroll flow path and the second scroll flow path from each other and a direction in which the partition wall extends may be inclined with respect to a virtual plane orthogonal to the axis at an angle of 30 to 50 degrees. This configuration enables the housing to be minimized.

The turbocharger according to the present disclosure is described in detail below with reference to the accompanying drawings. Like elements are given like reference signs in the description of the drawings and redundant explanation is omitted.

Figure 1:
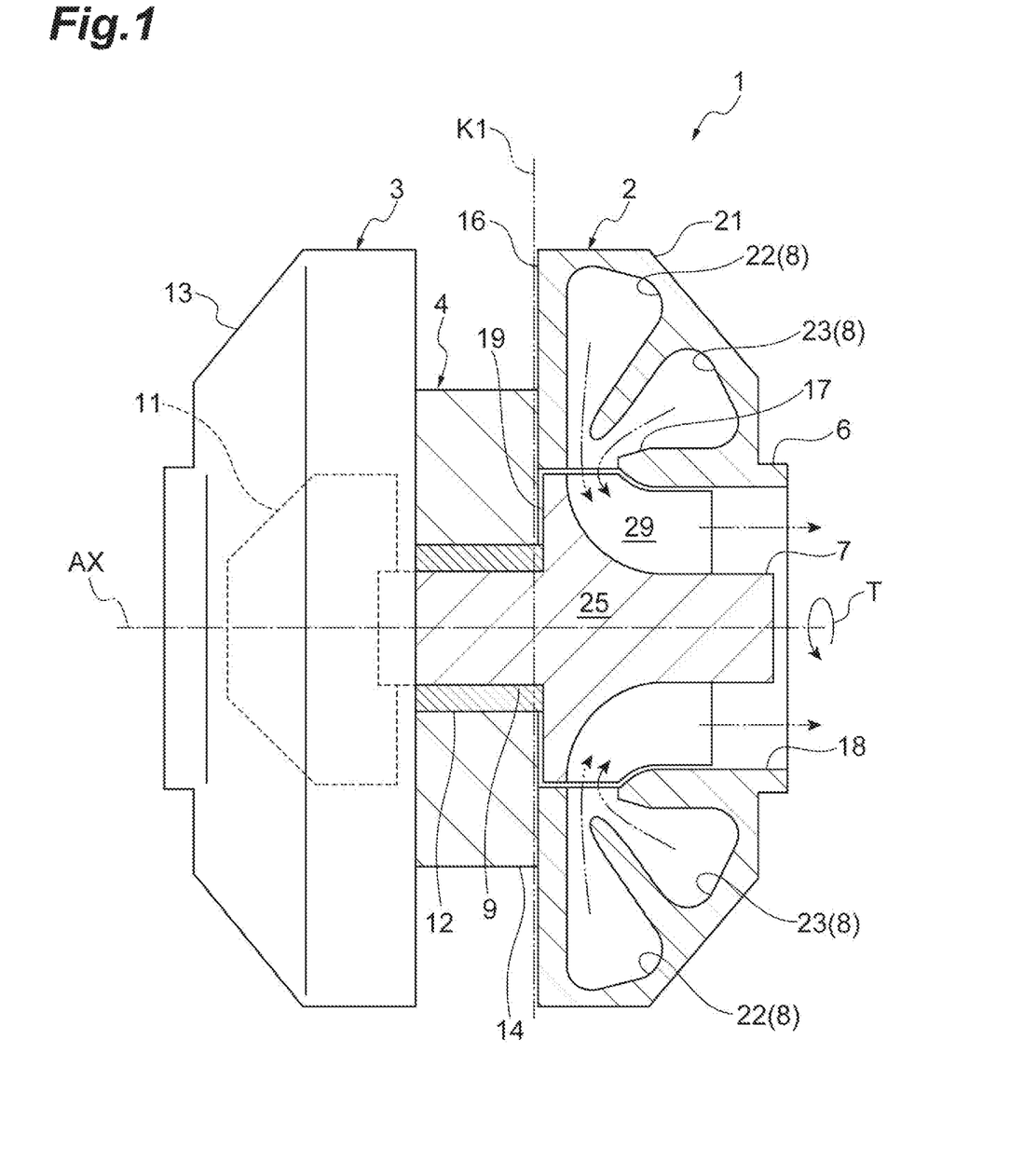
FIG. 1 is a diagram schematically showing the structure of a turbocharger according to the present disclosure.

As shown in FIG. 1, a turbocharger 1 is used, for example, in an internal combustion engine of a vehicle. For example, the turbocharger 1 is used in a small internal combustion engine. The turbocharger 1 includes a turbine 2, a compressor 3, and a connection part 4.

The turbine 2 includes a turbine housing 6 and a turbine wheel 7. The turbine housing 6 has a scroll part 8 that extends in a circumferential direction along an inner circumferential edge. The scroll part 8 guides a working fluid to the turbine wheel 7. The turbine wheel 7 is rotatably mounted relative to the turbine housing 6. The turbine wheel 7 converts energy that the working fluid has into rotational energy. The turbine wheel 7 is mounted on one end of a shaft 9. A compressor wheel 11 of the compressor 3 is mounted on another end of the shaft 9. The shaft 9 is rotatably supported by a bearing 12. The bearing 12 is disposed between the turbine wheel 7 and the compressor wheel 11. The bearing 12 is disposed in a bearing housing 14 of the connection part 4. The connection part 4 is mounted between the turbine housing 6 and a compressor housing 13.

In the turbocharger 1, the working fluid exhausted from an internal combustion engine (not shown) is supplied to the turbine wheel 7 via the turbine housing 6. The turbine wheel 7 then converts the energy that the working fluid has into rotational energy of the shaft 9. When the shaft 9 rotates, the compressor wheel 11 rotates. The compressor wheel 11 compresses the fluid (e.g., air) supplied to the internal combustion engine using the rotational energy.

The configuration of the turbine 2 will be described in further detail below.

Figure 2:
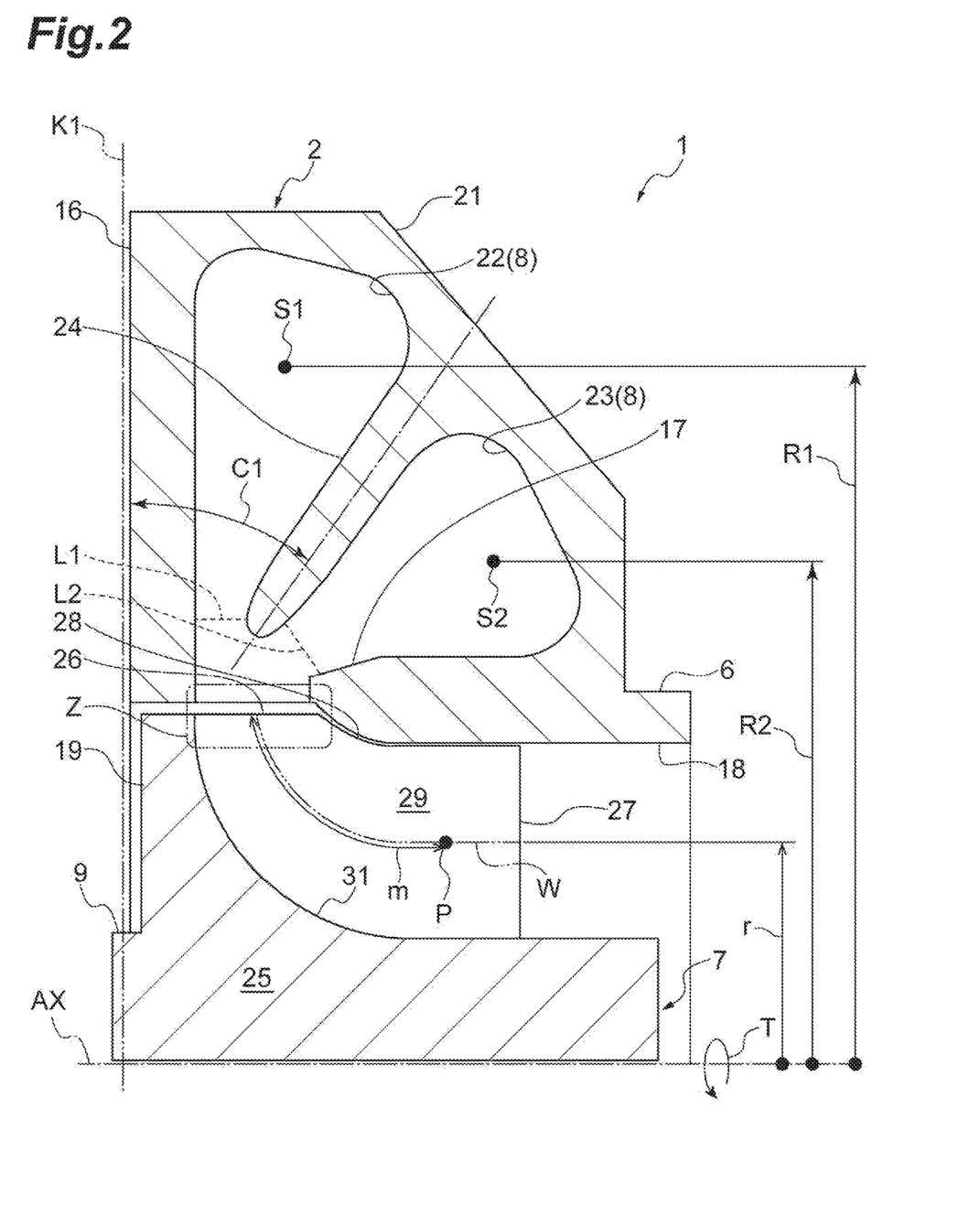
FIG. 2 is a diagram showing an enlarged cross-section of the major portion of FIG. 1.

The turbine 2 faces the compressor 3 with the bearing housing 14 therebetween. As shown in FIG. 2, the turbine 2 includes the turbine housing 6 and the turbine wheel 7. The turbine housing 6 is a base body of the turbine 2. The turbine housing 6 houses the turbine wheel 7. The turbine housing 6 receives the working fluid exhausted from the internal combustion engine and then guides the working fluid to the turbine wheel 7.

The turbine housing 6 includes a housing end face 16, the scroll part 8 that guides the working fluid to the turbine wheel 7, and a shroud 17 that faces the turbine wheel 7.

The housing end face 16 faces the compressor 3. The housing end face 16 is a face on an opposite side along a rotational axis AX from an outlet 18 for exhausting the working fluid. The housing end face 16 is proximate a reference plane K1.

The scroll part 8 is a flow path formed so as to surround the rotational axis AX. The scroll part 8 is surrounded by the housing end face 16, a housing side face 21, and the shroud 17. Thus, the scroll part 8 is not formed on a side of the compressor 3 beyond the position of the housing end face 16. That is, the scroll part 8 does not protrude significantly over the reference plane K1 toward the compressor 3. This configuration enables a G coupling (not shown) to be used for fastening the turbine housing 6 to the bearing housing 14.

The scroll part 8 includes a hub-side scroll flow path 22 (first scroll flow path) and a shroud-side scroll flow path 23 (second scroll flow path). The hub-side scroll flow path 22 is the flow path proximal to the reference plane K1. The shroud-side scroll flow path 23 is the flow path more distal to the reference plane K1 than the hub-side scroll flow path 22. As described above, the scroll part 8 is not formed on the side of the compressor 3 beyond the reference plane K1. When forming two flow paths for such scroll part 8, it is difficult to form them in the same shape. A distance from a centroid S1 of the hub-side scroll flow path 22 to the rotational axis AX is distance R1. A distance from a centroid S2 of the shroud-side scroll flow path 23 to the rotational axis AX is distance R2. The distance R1 is different from the distance R2. The difference between the distances R1 and R2 affects the state of the working fluid flowing out from the scroll flow paths 22, 23.

The hub-side scroll flow path 22 and the shroud-side scroll flow path 23 are separated from each other by a partition wall 24. The partition wall 24 extends diagonally to the reference plane K1. Specifically, an angle C1 formed between the direction in which the partition wall 24 extends and the reference plane K1 is 30 to 50 degrees.

The shroud 17 faces the turbine wheel 7. A flow path is thus formed between the shroud 17, a pair of adjacent blades 29, and a hub 25. A small clearance is provided between the shroud 17 and the turbine wheel 7. As a result, the turbine wheel 7 rotates about the rotational axis AX relative to the shroud 17.

The turbine wheel 7 includes the hub 25 that forms the main body thereof and the blades 29 formed on the hub 25. The hub 25 is a solid of revolution obtained by rotating a predetermined curve (hub line) about the rotational axis AX. The shaft 9 is formed on a turbine end face 19 of the hub 25. The blades 29 are foil led upstanding on an inclined face 31 of the hub 25. The hub 25 and the blades 29 are integrally formed. The hub 25 and the blades 29 rotate in unison with each other. That is, base ends of the blades 29 are the ends proximal to the hub 25. Opposite distal ends are disposed proximal to the shroud. The blades 29 are thus disposed between the hub 25 and the shroud 17.

Each of the blades 29 has a front edge 26 that receives the working fluid from the hub-side scroll flow path 22 and the shroud-side scroll flow path 23, a rear edge 27 that is on a side from which the working fluid is discharged, and a side edge 28 that connects the front edge 26 with the rear edge 27. The front edge 26 thus faces an outlet of the scroll part 8. The side edge 28 faces the shroud 17. The outlet of the scroll part 8 includes a hub-side outlet and a shroud-side outlet. That is, in the turbocharger 1, each blade 29 receives the working fluid that flows out from the hub-side scroll flow path 22 and the working fluid that flows out from the shroud-side scroll flow path 23. The turbocharger 1 having such a configuration is known as a twin scroll type.

In the twin scroll type turbocharger 1, flow of the working fluid from the hub-side scroll flow path 22 into the turbine wheel 7 and flow of the working fluid from the shroud-side scroll flow path 23 into the turbine wheel 7 occur alternately. When rotational speed of the internal combustion engine is low, the time during which the working fluid flows from the hub-side scroll flow path 22 into the turbine wheel 7 and the time during which the working fluid flows from the shroud-side scroll flow path 23 into the turbine wheel 7 are relatively long. In contrast, when the rotational speed of the internal combustion engine is high, the time during which the working fluid flows from the hub-side scroll flow path 22 into the turbine wheel 7 and the time during which the working fluid flows from the shroud-side scroll flow path 23 into the turbine wheel 7 are relatively short.

The flow of the working fluid flowing from the hub-side scroll flow path 22 onto the blades 29 will now be described. The flow of the working fluid flowing from the shroud-side scroll flow path 23 onto the blades 29 will also be described. The flow of the working fluid is indicated by a "flow angle α." Firstly, an A/R value is defined as a parameter. The A/R value is defined for the hub-side scroll flow path 22 and the shroud-side scroll flow path 23. Cross-sectional areas A1, A2 are cross-sectional areas of the scroll flow paths at cutwater locations. The distances R1, R2 (see FIG. 2) are distances from the rotational axis AX to the centroids S1, S2 of the cross-sectional areas at the cutwater locations. Using these variables, a flow angle α1 of the working fluid supplied from the scroll flow path 22 is determined by formula (1) with zero degrees being when the direction of the flow is radial. A flow angle α2 of the working fluid supplied from the scroll flow path 23 is determined by formula (2) with zero degrees being when the direction of the flow is radial.

[Math. 1]

$$\alpha 1 = \tan^{-1}\left(\frac{2\pi b}{A1/R1}\right) \quad (1)$$

[Math. 2]

$$\alpha 2 = \tan^{-1}\left(\frac{2\pi b}{A2/R2}\right) \quad (2)$$

Figure 3:
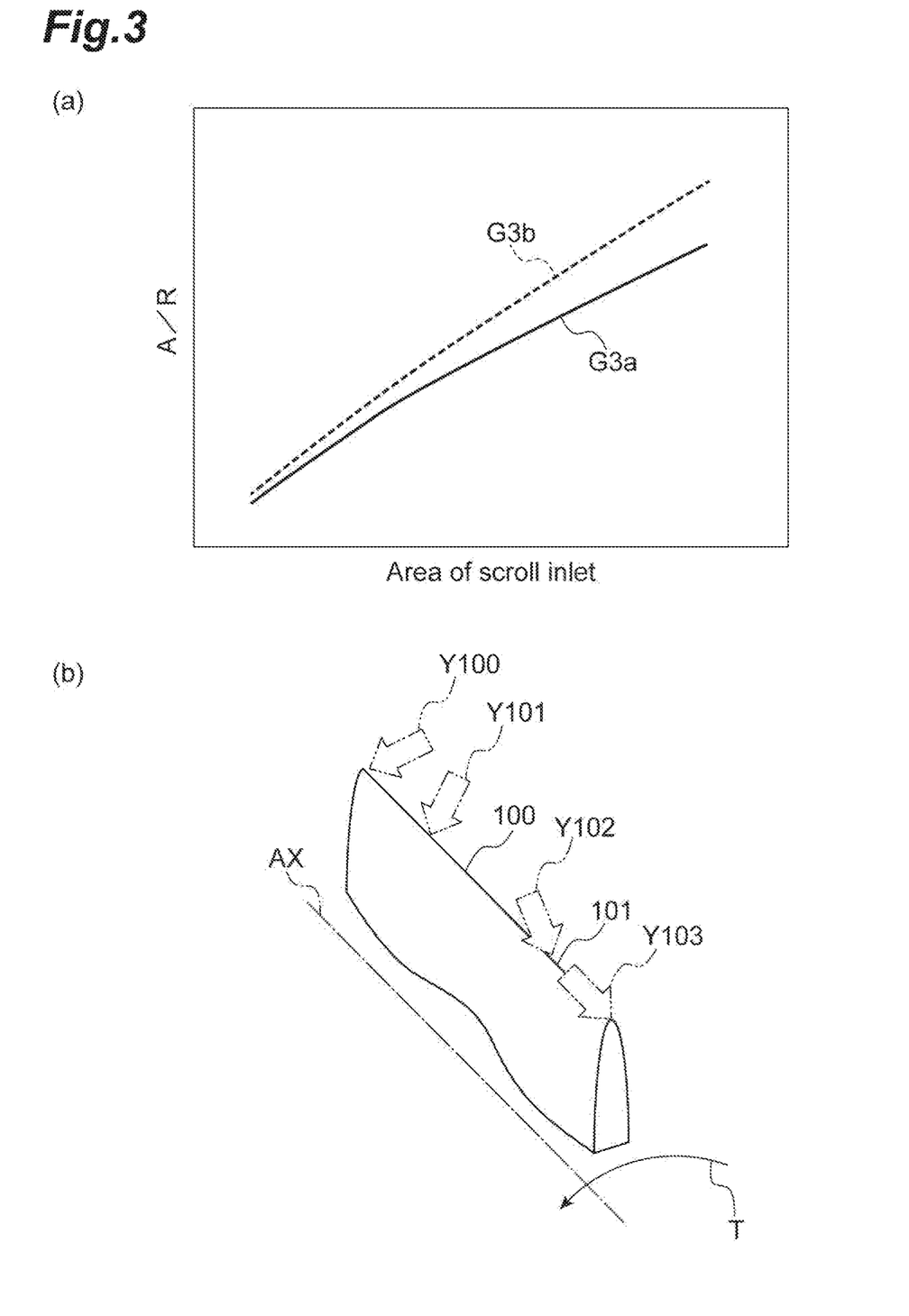
FIG. 3(a) is a graph for describing A/R values.
FIG. 3(b) is a schematic diagram for describing flow angles.

Now assume that heights b of the scroll paths that flow into the blades 29 are the same. Based on this assumption, when the A/R values of formulas (1) and (2) are large, the direction of flow of the working fluid flowing onto a blade 100 tends toward a radial direction (see arrow Y103) as shown in FIG. 3(b). In contrast, when the A/R values are small, the direction of flow of the working fluid flowing onto the blade 100 tends toward the circumferential direction (see arrow Y100).

FIG. 3(a) shows the A/R values of the hub-side scroll flow path 22 (graph G3a) and the A/R values of the shroud-side scroll flow path 23 (graph G3b). The shroud-side scroll flow path 23 is closer to the rotational axis AX than the hub-side scroll flow path 22. That is, the distance R2 of the shroud-side scroll flow path 23 is shorter than the distance R1 of the hub-side scroll flow path 22. Thus, as shown by graphs G3a, G3b in FIG. 3(a), the A/R values of the shroud-side scroll flow path 23 (graph G3b) are larger than the A/R values of the hub-side scroll flow path 22 (graph G3a). As an example, the A/R values of the shroud-side scroll flow path 23 are 110% to 130% of the A/R values of the hub-side scroll flow path 22.

The difference in the A/R values can be converted into the difference in the flow angles α by formulas (1), (2). When the A/R values of the shroud-side scroll flow path 23 are 110% to 130% of the A/R values of the hub-side scroll flow path 22 as described above, the difference in the flow angles α is 1 to 10 degrees. Thus, as shown in FIG. 3(b), the directions of flow (arrows Y100, Y101) of the working fluid that flows onto the blades 29 from the hub-side scroll flow path 22 are different from the directions of flow (arrows Y102, Y103) of the working fluid that flows onto the blades 29 from the shroud-side scroll flow path 23.

It is desired that separation of the flow of the working fluid from the blades 29 is suppressed to improve efficiency of the turbocharger 1. The portion (first portion) that receives the working fluid that flows in from the hub-side scroll flow path 22 thus has a shape appropriate for the flow angle α of the hub-side scroll flow path 22. Additionally, the portion (second portion) that receives the working fluid that flows in from the shroud-side scroll flow path 23 has a shape appropriate for the flow angle α of the shroud-side scroll flow path 23.

Figure 4:
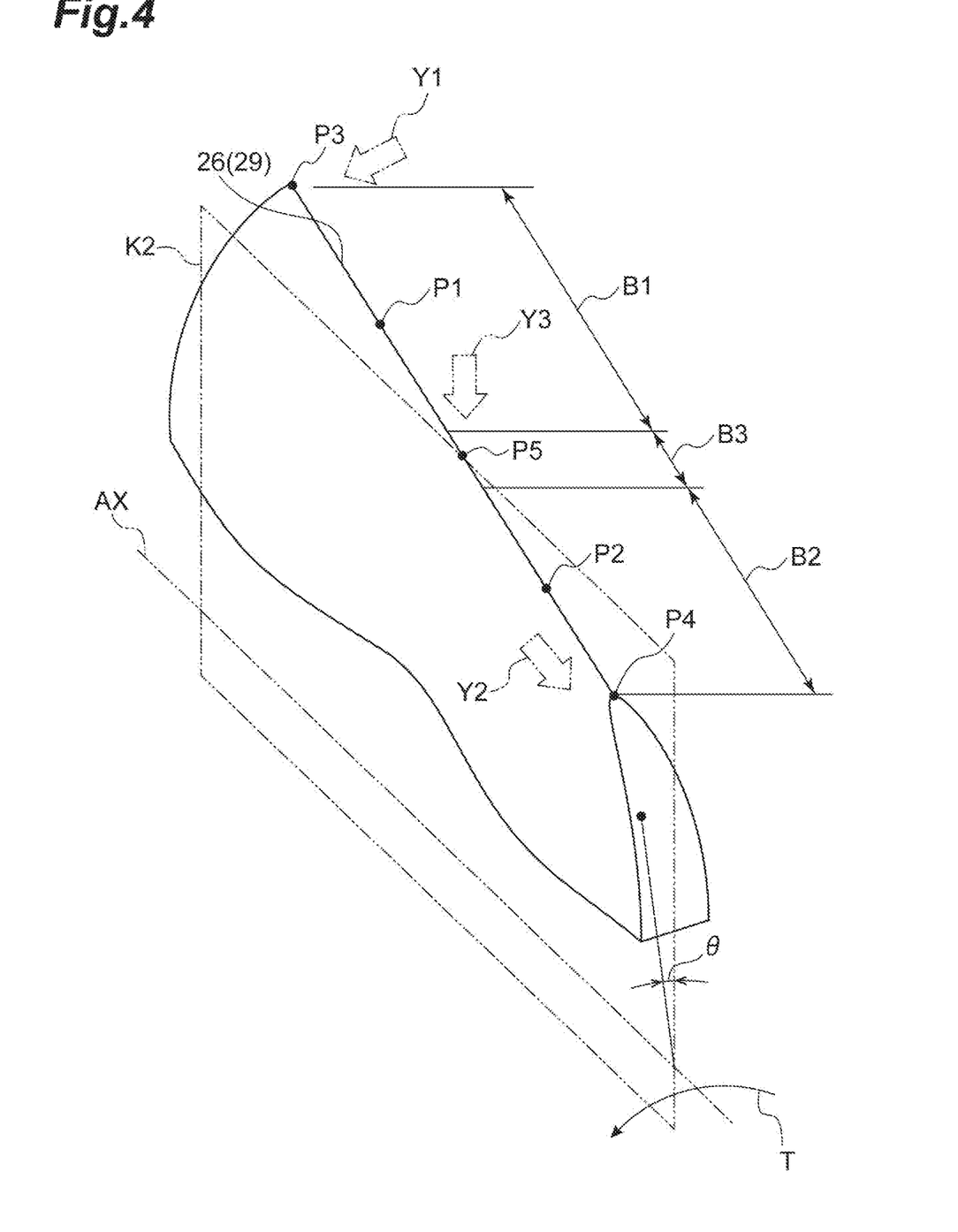
FIG. 4 is a schematic diagram for describing inclinations of a front edge of a blade.

Consequently, the shape of the front edge 26 of each blade 29 according to the present disclosure differ in a spanwise direction. The spanwise direction is the direction from the hub-side toward the shroud-side on the front edge 26. Referring to FIG. 4 showing an enlarged Z portion of FIG. 2, the working fluid of the hub-side scroll flow path 22 flows onto the blade 29 along a direction (arrow Y1) so as to follow a rotational direction T. The working fluid of the shroud-side scroll flow path 23 flows onto the blade 29 along a direction (arrow Y2) so as to follow the radial direction. In order to correspond to these directions, the hub-side of the front edge 26 is inclined in a direction opposite the rotational direction T and the shroud-side is inclined in the rotational direction T.

The shape of the front edge 26 is described further in detail below while presenting parameters which define the shape of the front edge 26.

The hub-side of the front edge 26 is inclined in the direction opposite the rotational direction T and the shroud-side is inclined in the rotational direction T as described above. This inclination is indicated by a "blade angle β." The "blade angle β" is determined by formula (3).

[Math. 3]

$$\tan\beta = r\frac{d\theta}{dm} \quad (3)$$

A meridian W (see FIG. 2) that extends from the front edge 26 to the rear edge 27 of the blade 29 will now be defined. Point P included in the meridian W will be defined. Coordinates of point P using a cylindrical coordinate system relative to the rotational axis AX is indicated by a radial coordinate r and a circumferential coordinate θ. The length from the front edge 26 to point P is a meridian plane length m.

Figure 5:
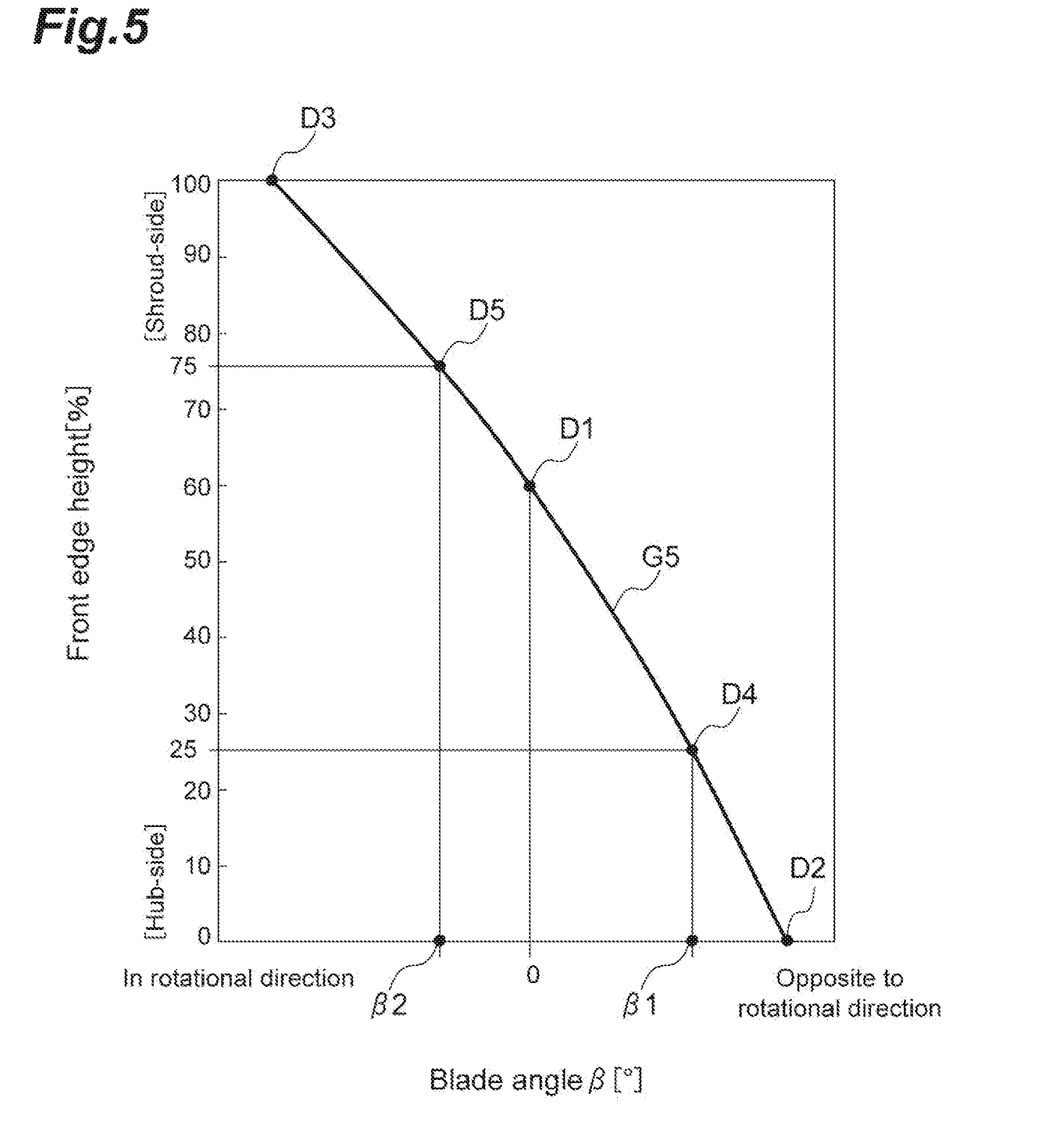
FIG. 5 is a graph for describing distribution of blade angles.

FIG. 5 is a graph that shows the distribution of the blade angles β of the front edge 26. The horizontal axis shows the blade angle β. The vertical axis shows the position on the front edge 26. For example, the bottom end (0%) represents the hub-side and the top end (100%) represents the shroud-side.

Graph G5 shows the distribution of the blade angles β of the front edge 26 of the turbine wheel 7 according to the present disclosure. According to graph G5, the front edge 26 of the turbine wheel 7 according to the present disclosure has different blade angles β at different positions. Graph G5 is continuous including a zero position P5 (see point D1 in FIG. 5) at which the blade angle β is zero. The absolute value of the blade angle β increases from the zero position P5 toward the hub-side. Similarly, the absolute value of the blade angle β increases from the zero position P5 toward the shroud-side. However, the polarity of the blade angle β on the shroud-side is opposite the polarity of the blade angle β on the hub-side. This shows that the directions of inclinations of the front edge 26 on the hub-side and the shroud-side are opposite each other across the zero position P5.

Graph G5 will be discussed further in detail below. The position of the hub 25 (point P3 in FIG. 4) is zero (point D2 in FIG. 5) and the position of the shroud 17 (point P4 in FIG. 4) is 100 (point D3 in FIG. 5). In addition, a point at which the distance from the hub 25 is 25 is a first reference point P1 (point D4 in FIG. 5). In addition, a point at which the distance from the hub 25 is 75 is a second reference point P2 (D5 in FIG. 5). The first reference point P1 is a representative point that receives the working fluid from the hub-side scroll flow path 22 on the front edge 26. Similarly, the second reference point P2 is a representative point that receives the working fluid from the shroud-side scroll flow path 23 on the front edge 26.

Although the present disclosure presents the first reference point P1 and the second reference point P2 as above, they are not limited to these values. The configuration of the hub-side scroll flow path 22 and the shroud-side scroll flow path 23 enable the first reference point P1 and the second reference point P2 on the front edge 26 to have predetermined values. For example, the first reference point P1 and the second reference point P2 may be arranged at positions in the range of 0 to 50 from the hub-side. Additionally, the first reference point P1 may be arranged at a position in the range of 0 to 50 from the hub-side, and the second reference point P2 may be arranged at a position in the range of 50 to 100 from the hub-side. Furthermore, the first reference point P1 and the second reference point P2 may be arranged at positions in the range of 50 to 100 from the hub-side.

The absolute value (|β1−β2|) of the difference between a first blade angle β1 at the first reference point P1 and a second blade angle β2 at the second reference point P2 is about 1 to 10 degrees. This difference corresponds to the difference in the flow angles α described above.

In other words, where a length of the front edge 26 from the hub 25 to the shroud 17 is 1, a first portion B1 includes the first reference point P1 set to a position on the front edge 26 at a length ¼ from the hub 25. Additionally, a second portion B2 includes the second reference point P2 set to a position on the front edge 26 at a length ¾ from the hub 25. Furthermore, a third portion B3 at which the blade angle β is zero is provided between the first portion B1 and the second portion B2.

The operation and advantages of the turbocharger 1 according to the present disclosure will now be described below.

In this turbocharger 1, the front edge 26 that receives the working fluid from the hub-side scroll flow path 22 and the shroud-side scroll flow path 23 is partially inclined with respect to a virtual plane K2 including the rotational axis AX. Specifically, the first portion B1 of the front edge 26 that receives the working fluid from the hub-side scroll flow path 22 is inclined with respect to the virtual plane K2 in the direction opposite the rotational direction T of the turbine wheel 7. Such first portion B1 enables the working fluid from the hub-side scroll flow path 22 to be received by the turbine wheel 7 while suppressing separation of the flow of the working fluid. Additionally, the second portion B2 of the front edge 26 that receives the working fluid from the shroud-side scroll flow path 23 is inclined with respect to the virtual plane K2 in the rotational direction T of the turbine wheel 7. Such second portion B2 enables the working fluid from the shroud-side scroll flow path 23 to be received by the blades 29 while suppressing separation of the flow of the working fluid. The working fluid can thus be received by the blades 29 while suppressing separation of the working fluid. As a result, efficiency of the turbocharger 1 is improved.

The front edge 26 is formed between the first portion B1 and the second portion B2. The front edge 26 includes the third portion B3 that is parallel to the virtual plane K2. This configuration enables the working fluid to be received by the blades 29 while advantageously suppressing separation of the working fluid. The efficiency of the turbocharger 1 is thus improved.

Where the length of the front edge 26 from the hub 25 to the shroud 17 is 1, the first portion B1 includes the first reference point P1 set to a position on the front edge 26 at a length ¼ from the hub 25. The second portion B2 includes the second reference point P2 set to a position on the front edge 26 at a length ¾ from the hub 25. This configuration enables the working fluid to be received by the blades 29 while further suppressing separation of the working fluid. Thus, the efficiency of the turbocharger 1 is further improved.

The difference between the first blade angle β1 of the front edge 26 at the first reference point P1 and the second blade angle β2 of the front edge 26 at the second reference point P2 is between 1 to 10 degrees. This configuration enables the working fluid to be received by the blades 29 while even further suppressing separation of the working fluid. Thus, the efficiency of the turbocharger 1 is even further improved.

At the front edge 26, the length from the rotational axis AX to the front edge 26 is constant along the rotational axis AX. This configuration also enables the separation of the working fluid to be suppressed. The efficiency of the turbocharger 1 is thus improved.

The turbine housing 6 has the partition wall 24 that separates the hub-side scroll flow path 22 and the shroud-side scroll flow path 23 from each other. The direction in which the partition wall 24 extends is inclined with respect to reference plane K1 orthogonal to the rotational axis AX at an angle of 30 to 50 degrees. This configuration enables the turbine housing 6 to be minimized.

The turbocharger 1 according to the present disclosure has been described in detail above. However, the turbocharger 1 according to the present disclosure is not limited to the embodiments above. Many variations of the turbocharger 1 according to the present disclosure are possible without departing from the scope thereof.

It should be noted that the definition of the cross-sectional area of the hub-side scroll flow path 22 and the cross-sectional area of the shroud-side scroll flow path 23 above are as described below. That is, the cross-sectional area of a scroll is the area, at any circumferential position, surrounded by inner walls of a scroll part and straight lines (broken lines L1, L2 in FIG. 2) which are the shortest distances between a central divider (partition wall 24) and opposing wall faces on a bearing housing side and a turbine outlet side. In other words, the cross-sectional area of the scroll may be the area, at each circumferential position, surrounded by inner walls of a turbine housing and the straight lines (broken lines L1, L2 in FIG. 2) which are the shortest distances between the central divider and each wall face opposing the central divider on the bearing housing side and the turbine outlet side.

REFERENCE SIGNS LIST

1 Turbocharger
2 Turbine
3 Compressor
4 Connection part
6 Turbine housing
7 Turbine wheel
8 Scroll part
11 Shaft
12 Compressor wheel
13 Bearing
14 Compressor housing
14 Bearing housing
16 Housing end face
17 Shroud
18 Outlet
19 Turbine end face
21 Housing side face
22 Hub-side scroll flow path
23 Shroud-side scroll flow path
24 Partition wall
29 Blade
26 Front edge
27 Rear edge
28 Side edge
25 Hub
31 Inclined face
AX Rotational axis
T Rotational direction
P1 First reference point
P2 Second reference point
B1 First portion
B2 Second portion
B3 Third portion
K2 Virtual plane
α Flow angle
β Blade angle
r Radial coordinate
m Meridian plane length
θ Circumferential coordinate

The invention claimed is:
1. A turbocharger comprising:
a housing including a first scroll flow path and a second scroll flow path formed so as to surround a predetermined axis; and
a turbine wheel having front edges for receiving a working fluid from the first scroll flow path and the second scroll flow path, the turbine wheel being disposed in the housing so as to be surrounded by the first scroll flow path and the second scroll flow path with the axis as a rotational axis, wherein the turbine wheel has blades having the front edges and a hub including base ends of the blades,
the housing includes a shroud covering the blades,
each front edge includes a first portion for receiving the working fluid flowing out from the first scroll flow path, and a second portion disposed more toward the shroud than the first portion for receiving the working fluid flowing out from the second scroll flow path,
the first portion being inclined with respect to a virtual plane including the axis in a direction opposite a rotational direction of the turbine wheel,
the second portion being inclined with respect to the virtual plane in the rotational direction,
where a length of each front edge from the hub to the shroud is 1, the first portion includes a first reference point set to a position on the front edge at a length ¼ from the hub, and the second portion includes a second reference point set to a position on the front edge at a length ¾ from the hub,
a difference between a first blade angle of the front edge at the first reference point and a second blade angle of the front edge at the second reference point is 1 to 10 degrees, and
wherein the turbine wheel has a turbine end face formed on a side opposite the shroud in the axis, and an entirety of the first scroll flow path and an entirety of the second scroll flow path are provided more to the shroud side than the turbine end face side.

2. The turbocharger according to claim 1, wherein each front edge includes a third portion formed between the first portion and the second portion, the third portion having a region parallel to the virtual plane.

3. The turbocharger according to claim 1, wherein at each front edge, a length from the axis to the front edge is constant along the axis.

4. The turbocharger according to claim 1, wherein the housing includes a partition wall separating the first scroll flow path and the second scroll flow path from each other, and a direction in which the partition wall extends is inclined with respect to a virtual plane orthogonal to the axis at an angle of 30 to 50 degrees.

5. The turbocharger according to claim 2, wherein at each front edge, a length from the axis to the front edge is constant along the axis.

6. The turbocharger according to claim 2, wherein the housing includes a partition wall separating the first scroll flow path and the second scroll flow path from each other, and a direction in which the partition wall extends is inclined with respect to a virtual plane orthogonal to the axis at an angle of 30 to 50 degrees.

7. The turbocharger according to claim 5, wherein the housing includes a partition wall separating the first scroll flow path and the second scroll flow path from each other, and a direction in which the partition wall extends is inclined with respect to a virtual plane orthogonal to the axis at an angle of 30 to 50 degrees.

8. The turbocharger according to claim 1, wherein the first scroll flow path is disposed on the turbine end face side, and the second scroll flow path is disposed on the shroud side.

9. The turbocharger according to claim 1, wherein the turbine wheel is provided at a first end part, a compressor wheel is provided at a second end part on an opposite side, and the first scroll flow path and the second scroll flow path are not formed on a side more to the compressor wheel than the turbine end face.

10. The turbocharger according to claim 1, wherein a shape of the first scroll flow path differs from a shape of the second scroll flow path.

11. The turbocharger according to claim 1, wherein a distance from the first scroll flow path to the rotational axis differ from a distance from the second scroll flow path to the rotational axis.

12. A turbocharger comprising:
a housing including a first scroll flow path and a second scroll flow path formed so as to surround a predetermined axis; and
a turbine wheel having front edges for receiving a working fluid from the first scroll flow path and the second scroll flow path, the turbine wheel being disposed in the housing so as to be surrounded by the first scroll flow path and the second scroll flow path with the axis as a rotational axis,
wherein the turbine wheel has blades having the front edges and a hub including base ends of the blades,
the housing includes a shroud covering the blades,
each front edge includes a first portion for receiving the working fluid flowing out from the first scroll flow path, and a second portion disposed more toward the shroud than the first portion for receiving the working fluid flowing out from the second scroll flow path,
the first portion being inclined with respect to a virtual plane including the axis in a direction opposite a rotational direction of the turbine wheel,
the second portion being inclined with respect to the virtual plane in the rotational direction,
where a length of each front edge from the hub to the shroud is 1, the first portion includes a first reference point set to a position on the front edge at a length ¼ from the hub, and the second portion includes a second reference point set to a position on the front edge at a length ¾ from the hub,
a difference between a first blade angle of the front edge at the first reference point and a second blade angle of the front edge at the second reference point is 1 to 10 degrees,
the turbine wheel has a turbine end face formed on a side opposite the shroud in the axis,
an entirety of the first scroll flow path is disposed between a partition wall extending in an incline direction with respect to the turbine end face, and the turbine end face, and
the entirety of the second scroll flow path is disposed between the partition wall and the axis.

13. A turbocharger comprising:
a housing including a first scroll flow path and a second scroll flow path formed so as to surround a predetermined axis; and
a turbine wheel having front edges for receiving a working fluid from the first scroll flow path and the second scroll flow path, the turbine wheel being disposed in the housing so as to be surrounded by the first scroll flow path and the second scroll flow path with the axis as a rotational axis,
wherein the turbine wheel has blades having the front edges and a hub including base ends of the blades,
the housing includes a shroud covering the blades,
each front edge includes a first portion for receiving the working fluid flowing out from the first scroll flow path, and a second portion disposed more toward the shroud than the first portion for receiving the working fluid flowing out from the second scroll flow path,
the first portion being inclined with respect to a virtual plane including the axis in a direction opposite a rotational direction of the turbine wheel,
the second portion being inclined with respect to the virtual plane in the rotational direction,
where a length of each front edge from the hub to the shroud is 1, the first portion includes a first reference point set to a position on the front edge at a length ¼ from the hub, and the second portion includes a second reference point set to a position on the front edge at a length ¾ from the hub,
a difference between a first blade angle of the front edge at the first reference point and a second blade angle of the front edge at the second reference point is 1 to 10 degrees,
the turbine wheel has a turbine end face formed on a side opposite the shroud in the axis, and
an entirety of the first scroll flow path and an entirety of the second scroll flow path are disposed between the turbine end face and the axis, when the first scroll flow path and the second scroll flow path are viewed in a cross section including the axis.

14. The turbocharger according to claim 13, wherein the first scroll flow path is disposed on the turbine end face side, and the second scroll flow path is disposed on the axis side.

* * * * *